United States Patent [19]

Dshkhunian et al.

[11] Patent Number: 4,471,428
[45] Date of Patent: Sep. 11, 1984

[54] MICROCOMPUTER PROCESSOR

[76] Inventors: Valery L. Dshkhunian, K-482, korpus 338A, kv. 73; Sergei S. Kovalenko, K-498, korpus 421, kv. 3; Pavel R. Mashevich, K-482, korpus 338A, kv. 139; Vyacheslav V. Telenkov, K-527, korpus 811, kv. 75; Jury E. Chicherin, K-460, korpus 161, kv. 31, all of Moscow, U.S.S.R.

[21] Appl. No.: 338,886

[22] Filed: Jan. 12, 1982

[51] Int. Cl.³ .............................................. G06F 9/22
[52] U.S. Cl. .................................................... 364/200
[58] Field of Search ................................ 364/200, 900

[56] References Cited

U.S. PATENT DOCUMENTS

| | | | |
|---|---|---|---|
| 4,079,447 | 3/1978 | Garziera | 364/200 |
| 4,338,663 | 7/1982 | Strecker et al. | 364/200 |
| 4,342,078 | 7/1982 | Tredennick et al. | 364/200 |
| 4,348,721 | 9/1982 | Brereton et al. | 364/200 |
| 4,348,743 | 9/1982 | Dozier | 364/900 |
| 4,360,868 | 11/1982 | Retter | 364/200 |

*Primary Examiner*—Jerry Smith
*Assistant Examiner*—Mark P. Watson
*Attorney, Agent, or Firm*—Holman & Stern

[57] ABSTRACT

A microcomputer processor comprises a scratch-pad storage, an arithmetic-logical unit, an interface unit and a microprogram unit, all interconnected by means of an intraprocessor data bus, and a processor status register. The processor further comprises a constant file, first and second switching elements connected to the arithmetic-logical unit, a register, a source of logic potentials and a decoder. The present invention helps increase the speed of microcomputer processor and expand its functional capabilities.

1 Claim, 2 Drawing Figures

MICROCOMPUTER PROCESSOR

FIELD OF THE INVENTION

The present invention relates to digital computers and, in particular, it relates to a microcomputer processor designed for data processing.

BACKGROUND OF THE INVENTION

This invention can be used in data processing devices, as well as in automatic and telemechanical devices and in general-purpose computer systems.

There is known in the art a microcomputer processor (cf., U.S. Pat. No. 4,016,546, class 340/172.5, Int. Cl. G 06 F 9/20, published in 1975) comprising an address line, a data bus, registers connected therewith, an arithmetic-logical device, and a control unit connected to the registers and to the arithmetic-logical device. Said prior art processor lacks means for implementing algorithms of symbolic processing at the microprogramming level, which affects the overall performance of the processor.

Closest of all to the herein disclosed microcomputer processor, as regards its technical essence, is a microcomputer processor (cf., Mark I. Sebern, A Minicomputer-Compatible Microcomputer System: The DEC LSI-11, Proceedings of the IEEE, Vol. 64, No. 6, June 1976) comprising a scratch-pad storage for storing digital data in the course of the microcomputer processor operation, an arithmetic-logical unit for digital data conversion, an interface unit for digital data exchange, all of said units interconnected by means of an intraprocessor data bus. The latter prior art microcomputer processor further comprises a microprogram unit for control over the execution of digital data conversion and exchange operations in the microcomputer processor, a first input of said microprogram unit being connected to the intraprocessor data bus while its output is connected to control inputs of the scratch-pad storage, an arithmetic-logical unit and an interface unit, and a processor status register for storing the arithmetic operation code. The input of the processor status register is connected to the output of the arithmetic-logical unit while its output is connected to a second input of the microprogram unit. The control input of the processor status register is connected to the output of the microprogram unit.

In this latter prior art microcomputer processor, provision is made for a microinstruction format for character-by-character operation and for conditional jump microinstruction format. However, the microinstruction field for character-by-character operation, as well as the microinstruction field to be used for conditional jumps, is limited to eight bits, and operations with 16-bit words are executed over two or more computer cycles. The expansion of the microinstruction field for characters would lead to a considerable increase in the volume of the microprogram unit. Therefore, the speed of execution of instructions for symbolic data processing is not high. Moreover, said prior art processor is incapable of processing binary-coded-decimal numbers at the microprogramming level, this presenting a limitation of its functional capabilities.

SUMMARY OF THE INVENTION

It is the object of the present invention to develop a microcomputer processor providing for an increased speed of execution of instructions for symbolic data processing and featuring expanded functional capabilities.

The object stated is attained in a microcomputer processor designed for data processing and comprising a scratch-pad storage for storing digital data in the course of the microcomputer processor operation, an arithmetic-logical unit for digital data conversion, an interface unit for digital data exchange, all of said units interconnected by means of an intraprocessor data bus, a microprogram unit for control over the execution of digital data conversion and exchange operations in the microcomputer processor, a first input of said microprogram unit being connected to the intraprocessor data bus and its output connected to control inputs of the scratch-pad storage, arithmetic-logical unit and interface unit, a processor status register for storing the arithmetic operation code whose input is connected to an output of the arithmetic-logical unit while its output is connected to a second input of the microprogram unit, and a control input of the processor status register being connected to the output of the microprogram unit; and, according to the present invention, provision is made for a constant file whose output is connected to an input of the arithmetic-logical unit, first and second switching elements whose outputs are connected to the input of the arithmetic-logical unit, a register for storing an instruction being executed, a source of logic potentials, a first input of the first switching element being connected to the output of the processor status register while a first input of the second switching element is connected to an output of the register whose input is connected to the intraprocessor data bus and second inputs of the switching elements are connected to an output of the source of logic potentials, a decoder whose input is connected to the output of the microprogram unit while its output is connected to a control input of the constant file and control inputs of the first and second switching elements.

The processor of the invention makes for the execution of increment and decrement instructions with fixed steps of 1, 2, 3, 4, . . . n, symbolic processing instructions, as well as conventional jump and correction operations, when working with binary-coded decimal numbers, over a single computer cycle. The eight-bit field of microinstruction supplied to the decoder input permits of addressing up to 256 constants, i.e., the number of possible constants increases while the total volume of the microprogram unit remains the same. In addition, there is provided a speed up of the execution of instructions in which the operand addresses are generated by the field of instruction bits. This results in an increased operation speed of the microcomputer processor and expanded functional capabilities of the latter.

BRIEF DESCRIPTION OF DRAWINGS

The present invention will be better understood upon considering the following description of an examplary embodiment thereof, with due reference to the accompanying drawings in which.

DETAILED DESCRIPTION OF THE INVENTION

Figure 1:
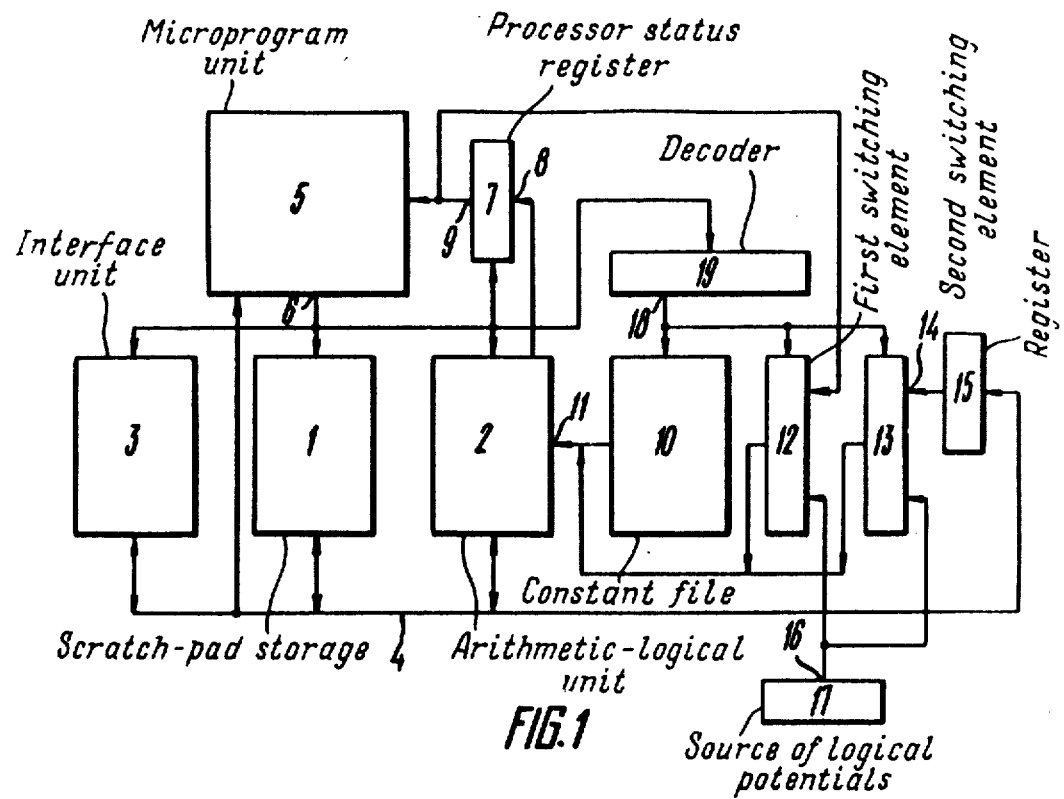
FIG. 1 is a block diagram of the microcomputer processor according to the present invention.

Referring now to FIG. 1 of the accompanying drawings, the herein disclosed microcomputer processor designed for data processing comprises a scratch-pad storage 1, an arithmetic-logical unit 2 and an interface unit 3, all interconnected by means of an intraprocessor data bus 4. The processor also comprises a microprogram unit 5 whose first input is connected to the intraprocessor data bus 4 while its output 6 is connected to control inputs of the scratch-pad storage 1, arithmetic-logical unit 2 and interface unit 3. In addition, the microcomputer processor comprises a processor status register 7 for storing the arithmetic operation code such as "result equal to zero", "negative sign of the result", "excessive word length", "tetrad carry" and the like. An input 8 of the processor status register 7 is connected to an output of the arithmetic-logical unit 2 while its output 9 is connected to a second input of the microprogram unit 5. The output 6 of the microprogram unit 5 is connected to a control input of the processor status register 7. The microcomputer processor further comprises a constant file 10 which is a ROM whose capacity is equal to that of the arithmetic-logical unit 2, the output of said constant file being connected to an input 11 of the arithmetic-logical unit 2. The processor also comprises first and second switching elements, 12 and 13, whose outputs are connected to the input 11 of the arithmetic-logical unit 2. A first input of the first switching element 12 is connected to the output 9 of the processor status register 7. A first input 14 of the second element 13 is connected to an output of a register 15 whose input is connected to the intraprocessor data bus 4. Second inputs of the first and second switching elements 2 and 13 are connected to an output 16 of a source 17 of logic potentials (for most of the logic elements, zero potential and the potential of the circuit power supply serve as the logical zero and one potentials). Control inputs of the switching elements 12, 13 and input of the constant file 10 are connected to an output 18 of a decoder 19 whose input is connected to the output 6 of the microprogram unit 5.

The first switching element 12 includes an AND-circuit 20 (FIG. 2) and a programmable switching element 21. A first input 22 of the AND-circuit 20 is connected to the control input of the element 12 (FIG. 1) while a second input of the AND-circuit 20 (FIG. 2) is connected to an output 23 of the programmable switching element 21. An output 24 of the AND-circuit 20 is connected to the output of the switching element 12 (FIG. 1). A first input 25 (FIG. 2) of the programmable switching element 21 is connected to the first input of the switching element 12 (FIG. 1). A second input 26 (FIG. 2) of the programmable switching element 21 is connected to the second input of the switching element 12 (FIG. 1). The programmable switching element 21 is programmed with the aid of a mask in the course of manufacture. Supplied to the programmable switching element 21 is either a signal from the processor status register (FIG. 1) or the potential of logical zero or one from the output 16 of the source 17 of logic potentials. The second switching element 13 has an analogous functional diagram.

The operation of the herein disclosed microcomputer processor is described below.

An instruction for execution is supplied from the interface unit 3 to the first input of the microprogram unit 5 and to the input of the register 15 where it is stored. Each one of the instructions executed by the microcomputer processor is interpreted by the microprogram unit to a sequence of microinstructions containing the following fields: field of control over the arithmetic-logical unit 2, field of operand address in the scratch-pad storage 1, field of control over the interface unit 3, field of control over the processor status register and the field of microinstruction bits supplied to the input of the decoder 19.

The decoder 19 shapes a signal permitting selection from the constant file 10 of one of the constants, or of a signal controlling one of the switching elements 12, 13. In so doing, the selected constant is transmitted to the input 11 of the arithmetic-logical unit 2.

Figure 2:
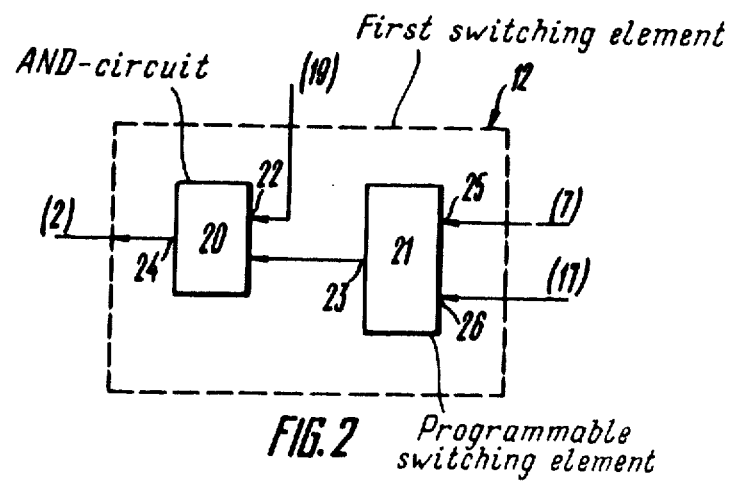
FIG. 2 is a functional diagram of a switching element, according to the present invention.

In case the access signal has been supplied to the control input of one of the switching elements 12, 13, a data word is transmitted to the input 11 of the arithmetic-logical unit 2, some of the bits of said word coinciding with the data stored in the processor status register 7 or with the data stored in the register 15. The other bits of the word are equal to zero or one. The actual content of bits of such data words is preset by the programmable switching element 21 (FIG. 2). For example, in order to realize a conditional jump instruction, it is necessary that eight least significant bits of the data word should repeat eight least significant bits of the data word stored in the register 15 (FIG. 1) while eight most significant bits should repeat the eighth bit of the stored data word. For the correction of execution of operations with binary-coded decimal numbers, the third and first bits of each tetrad should repeat the data in the respective flip-flop (not shown in the drawing) of the processor status register 7 recording tetrad carries. The remaining bits should be equal to zero.

The selected constant or operand, part of whose bits coincides with the contents of the register 15 or of the processor status register 7, is supplied to the input 11 of the arithmetic-logical unit 2. Another operand is supplied via the intraprocessor data bus 4 from the scratch-pad storage 1 or from the interface unit 3. The arithmetic-logical unit 2 executes the operation, the, result of which is either written in the scratch-pad storage 1 or transmitted to the interface unit 3. This terminates the execution of the instruction, and the processor starts accessing for the selection and execution of the following instruction.

Consider now the operation of the switching elements 12, 13. A signal at the control input of the first switching element 12 is transmitted to the first input 22 (FIG. 2) of the AND-circuit 20 and enables the data passage from the output 23 of the programmable switching element 21 to the output of the first switching element 12. The programmable switching element 21 transfers the data from its inputs 25, 26 to the output 23, the direction of data transfer being programmed with the aid of a mask in the course of manufacture. To the output 23 of the programmable switching element 21 there may be transmitted either the data stored in the processor status register 7 (FIG. 1) or logical zero, or logical one from the output 16 of the source 17 of logic potentials. The second switching element 13 functions analogously.

The herein disclosed microcomputer processor makes for the execution of increment and decrement instructions with a fixed step of 1, 2, 3, 4, ... n, symbolic processing instructions, as well as conventional jump and correction operations, when working with binary-coded decimal numbers, over a single computer cycle. The eight-bit field of microinstruction, supplied to the input of the decoder 19, permits of addressing up to 254 constants and two switching elements 12, 13, that is 256 altogether, i.e., the number of possible constants increases while the total volume of the microprogram unit 5 remains the same. This results in an increased operation speed of the microcomputer processor and expanded functional capabilities of the latter, as well as in a faster execution of symbolic processing instructions.

1. A microcomputer processor designed for data processing, comprising:
- a scratch-pad storage for storing digital data in the course of operation of said microcomputer processor; a control input of said scratch-pad storage;
- an arithmetic-logical unit for the conversion of said digital data; an input, a control input and an output of said arithmetic-logical unit;
- an interface unit for the exchange of said digital data; a control input of said interface unit;
- an intraprocessor data bus serving to interconnect said scratch-pad storage, said arithmetic-logical unit and said interface unit;
- a microprogram unit for control over the execution of said digital data conversion and exchange in said microcomputer processor; a first input of said microprogram unit connected to said intraprocessor data bus; a second input of said microprogram unit; an output of said microprogram unit connected to said control inputs of said scratch-pad storage, arithmetic-logical unit and interface unit;
- a processor status register for storing the arithmetic operation code; an input of said processor status register connected to said output of said arithmetic-logical unit; an output of said processor status register connected to said second input of said microprogram unit; and control input of said processor status register connected to said output of said microprogram unit;
- a constant file; an output of said constant file connected to said input of said arithmetic-logical unit; a control input of said constant file;
- a first switching element; an output of said first switching element connected to said input of said arithmetic-logical unit; a first input of said first switching element connected to said output of the processor status register; a second input, a control input of said first switching element;
- a second switching element; an ouput of said second switching element connected to said input of said arithmetic-logical unit; a first input, a second input a control input of said second switching element;
- an instruction register for storing an instruction being executed; an input of said instruction register connected to said intraprocessor data bus; an output of said instruction register connected to said first input of said second switching element;
- a source of logic potentials; an output of said source of logic potentials connected to said second inputs of said first and second switching elements;
- a decoder; an input of said decoder, connected to said output of said microprogram unit; an output of said decoder connected to said control inputs of said constant file and of said first and second switching elements.

* * * * *